United States Patent [19]

Berry

[11] Patent Number: 4,612,022

[45] Date of Patent: Sep. 16, 1986

[54] PROCESS FOR INCREASING THE CONCENTRATION OF ONE COMPONENT IN A MULTI-COMPONENT GASEOUS MIXTURE

[75] Inventor: W. Wes Berry, Lakeland, Fla.

[73] Assignee: Progress Equities Incorporated, St. Petersburg, Fla.

[21] Appl. No.: 747,434

[22] Filed: Jun. 21, 1985

[51] Int. Cl.⁴ .............................................. B01D 53/06
[52] U.S. Cl. .................................... 55/60; 55/62; 55/68; 55/75; 55/78
[58] Field of Search .................. 55/60, 62, 68, 75, 77, 55/78; 423/210, 219

[56] References Cited

U.S. PATENT DOCUMENTS

| | | | |
|---|---|---|---|
| 2,630,191 | 3/1953 | Miller | 55/78 X |
| 2,739,670 | 3/1956 | Miller | 55/78 X |
| 2,771,964 | 11/1956 | Miller | 55/60 |
| 2,784,804 | 3/1957 | Miller | 55/60 |
| 2,799,360 | 7/1957 | Miller | 55/60 |
| 2,799,361 | 7/1957 | Miller | 55/60 |
| 2,799,362 | 7/1957 | Miller | 55/78 X |
| 2,799,363 | 7/1957 | Miller | 55/60 |
| 2,799,364 | 7/1957 | Miller | 55/78 X |
| 2,823,764 | 2/1958 | Miller | 55/78 X |
| 2,861,651 | 11/1958 | Miller | 55/60 |
| 2,877,861 | 3/1959 | Miller | 55/60 |
| 3,080,692 | 3/1963 | Staley et al. | 55/60 X |
| 3,201,921 | 8/1965 | Heyes | 55/78 X |
| 4,264,339 | 4/1981 | Jüntgen et al. | 55/68 X |
| 4,477,418 | 10/1984 | Mullhaupt et al. | 423/219 |
| 4,522,726 | 6/1985 | Berry et al. | 55/78 X |

*Primary Examiner*—Robert Spitzer
*Attorney, Agent, or Firm*—Burns, Doane, Swecker & Mathis

[57] ABSTRACT

A process for enhancing the concentration of one component contained in a multi-component gas is disclosed which is particularly well-suited for enriching the oxygen content of air. The process is carried out by a series of adsorption and desorption stages using an Advanced Separation Device comprised of a plurality of adsorbent-filled chambers moving about a circular path in periodic fluid communication with a plurality of fixed feed and discharge ports. By using the Advanced Separation Device, it is possible to load the oxygen content of air onto the adsorbent which is then stripped by a second stream of air. This oxygen-enriched stream of air may then be divided so that the oxygen content of one stream may be adsorbed for subsequent removal by the other stream to produce a doubly-enriched stream.

9 Claims, 5 Drawing Figures

PROCESS FOR INCREASING THE CONCENTRATION OF ONE COMPONENT IN A MULTI-COMPONENT GASEOUS MIXTURE

BACKGROUND OF THE INVENTION

The present invention relates to a process for enhancing the concentration of one component contained in a multi-component gas and, more particularly, to a process for enriching air by increasing the concentration of oxygen therein.

Oxygen-enriched air, as opposed to pure oxygen, is often sought by industry in order to improve combustion or, more recently, to enhance processes in biotechnology. Heretofore, oxygen-enriched air has been obtained by either mixing air with pure oxygen produced by well known cryogenic techniques or, alternatively, by pressure-swing adsorption techniques.

In conventional pressure-swing techniques, air under pressure is passed through a fixed bed adsorption system. Typically, an adsorbent such as a molecular sieve is used, the sieve preferentially adsorbing nitrogen. The gas discharged from the bed is thus higher in oxygen content than that being fed into the bed. After the adsorption, the pressure is reduced to atmospheric or even sub-atmospheric levels, and the nitrogen is desorbed from the bed. The bed is then returned to the nitrogen adsorption cycle.

The above-described technique is suitable for producing relatively small quantities of enriched air so long as the system remains relatively simple. However, as the system becomes more complex or if a higher degree of enrichment is required, the pressure-swing techniques as well as any other techniques utilizing fixed bed systems become unduly complicated and expensive to run.

Other available air enrichment systems, such as membrane separation systems, often do not require as complicated a set-up but are nonetheless disadvantageous due to the limited amounts of air which may be treated therewith.

SUMMARY AND OBJECTS OF THE INVENTION

In view of the foregoing limitations and shortcomings of prior art processes, as well as other disadvantages not specifically mentioned above, it should be apparent that there still exists a need in the art for a process wherein large volumes of air may be continuously and economically enriched with respect to oxygen content. It is, therefore, a primary objective of this invention to fulfill that need by providing a process for enriching air utilizing an Advanced Separation Device (ASD) which makes the enrichment of air by adsorption techniques economically practicable.

Another object of this invention is to provide a process for enriching air which makes it possible to divide a stream of oxygen-enriched air into two separate streams and to then strip the oxygen from the first stream for simultaneous and continuous loading into the second stream so as to obtain a product air stream having an even greater concentration of oxygen.

Yet another object of this invention to provide a process for enriching air which may be carried out with virtually any volume of air at relatively low pressures i.e., below four atmospheres thus making it satisfactory regardless of the process requirements.

A further object of this invention is to provide a process which utilizes a thermal swing approach to regenerate the adsorbent bed which improves the versatility of this technique.

Briefly described, those and other objects of the invention are accomplished by carrying out the process in an Advanced Separation Device (ASD) which comprises a plurality of adsorbent filled chambers which move about a circular path in periodic fluid communication with a plurality of fixed feed ports and fixed discharge ports at an end of the chambers opposite to that of the fixed feed ports. Since materials being discharged from the fixed discharge ports are readily purged from the system, recirculated to another feed port, or a combination of both, it is possible by virtue of the ASD to:

(1) load the oxygen contained in air onto a suitable adsorbent in the chambers by supplying air at relatively low pressure to one or more fixed adsorption stage feed ports for delivery into the chamber;

(2) strip the oxygen from the adsorbent by supplying a higher temperature stream containing air to one or more fixed desorption stage feed ports for delivery into the chambers containing the oxygen loaded adsorbent so as to produce an oxygen enriched stream of air; and (3) divide the oxygen-enriched stream of air into two separate streams, the first of which is cooled and supplied to a second adsorption stage feed port where it is delivered and loaded onto the adsorbent and the second of which is heated and supplied to a second desorption stage feed port where it strips the adsorbent loaded with oxygen by the first oxygen-enriched stream thereby resulting in a further enriched product stream. This process of dividing the oxygen enriched stream into two separate streams and then stripping the oxygen from one of those streams to simultaneously and continuously further enrich the other stream may be repeated one or more times as desired.

DETAILED DESCRIPTION OF PREFERRED EMBODIMENTS

The process of the present invention is carried out in the Advanced Separation Device which is described in detail in assignee's copending application Ser. No. 713,492 filed Mar. 19, 1985, the disclosure of which is hereby incorporated by reference.

Figure 1:
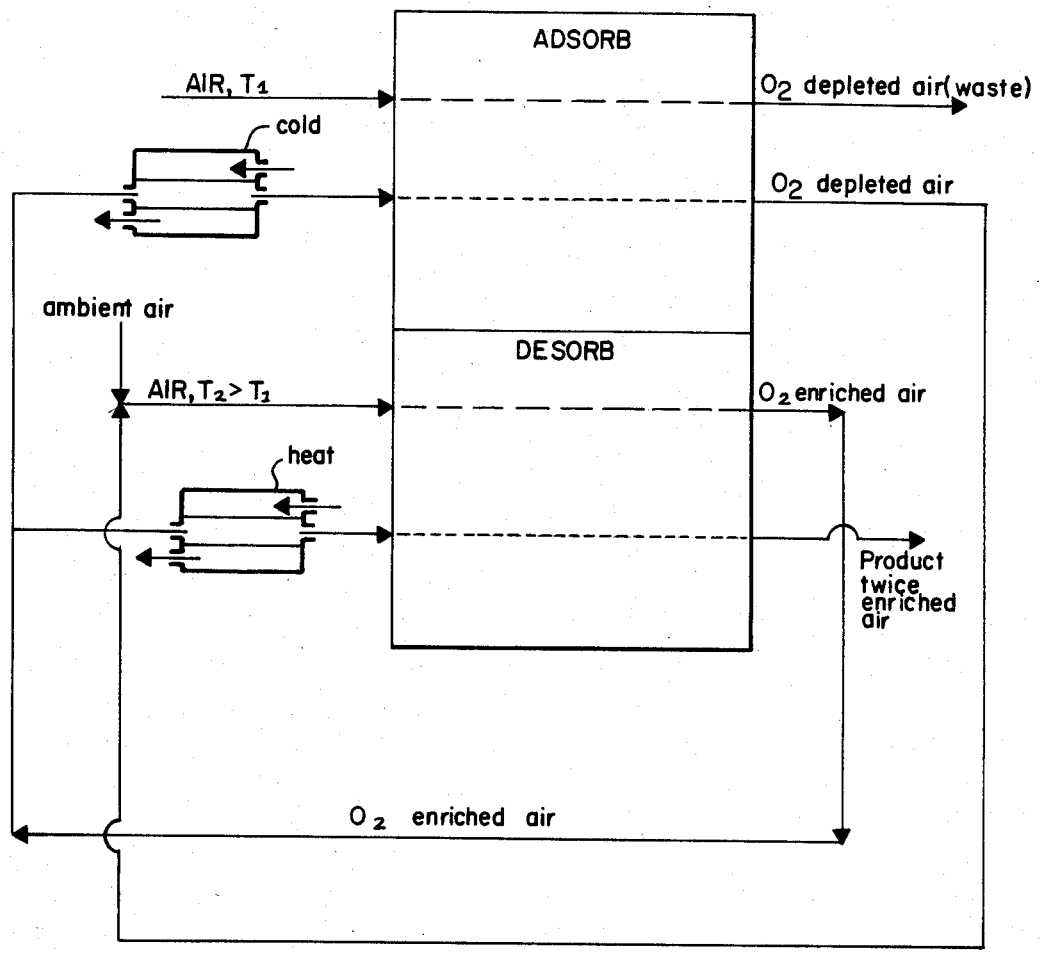
FIG. 1 is a flow diagram illustrating the overall process concept of the invention.

The overall process concept of the present invention is described in FIG. 1. Generally, ambient air at a temperature $T_1$ is supplied to the ASD where the oxygen contained therein will come into contact with and be adsorbed by a suitable adsorbent. The air exhaust, now being $O_2$ depleted, is expelled from the ASD as waste.

A second stream of air, which may contain some recycled air from later stages, is then supplied to the ASD for delivery to the oxygen loaded adsorbent. The second stream is at a temperature $T_2$, which is greater than the temperature $T_1$ of the first stream and thereby effects desorption of the previously loaded $O_2$ from the adsorbent. The exiting stream is thus oxygen enriched.

The oxygen enriched stream leaving the ASD is then divided into two separate streams. The first stream is cooled and then delivered to the ASD where the oxygen contained therein is loaded onto the adsorbent. The other oxygen-enriched stream is heated and then delivered to the ASD where oxygen loaded onto the adsorbent by the other oxygen enriched stream will be stripped so as to produce a doubly enriched stream of air.

Although the overall process concept described above as well as the specific embodiments described below all relate to the enrichment of the oxygen content in air, it will be appreciated that the process concept is equally applicable to other multi-component gases when it is desired to increase the concentration of one particular component. All that is required is that the adsorbent material used have a greater affinity for the one component sought to be enriched than for the other components of the gaseous mixture.

Figure 2:
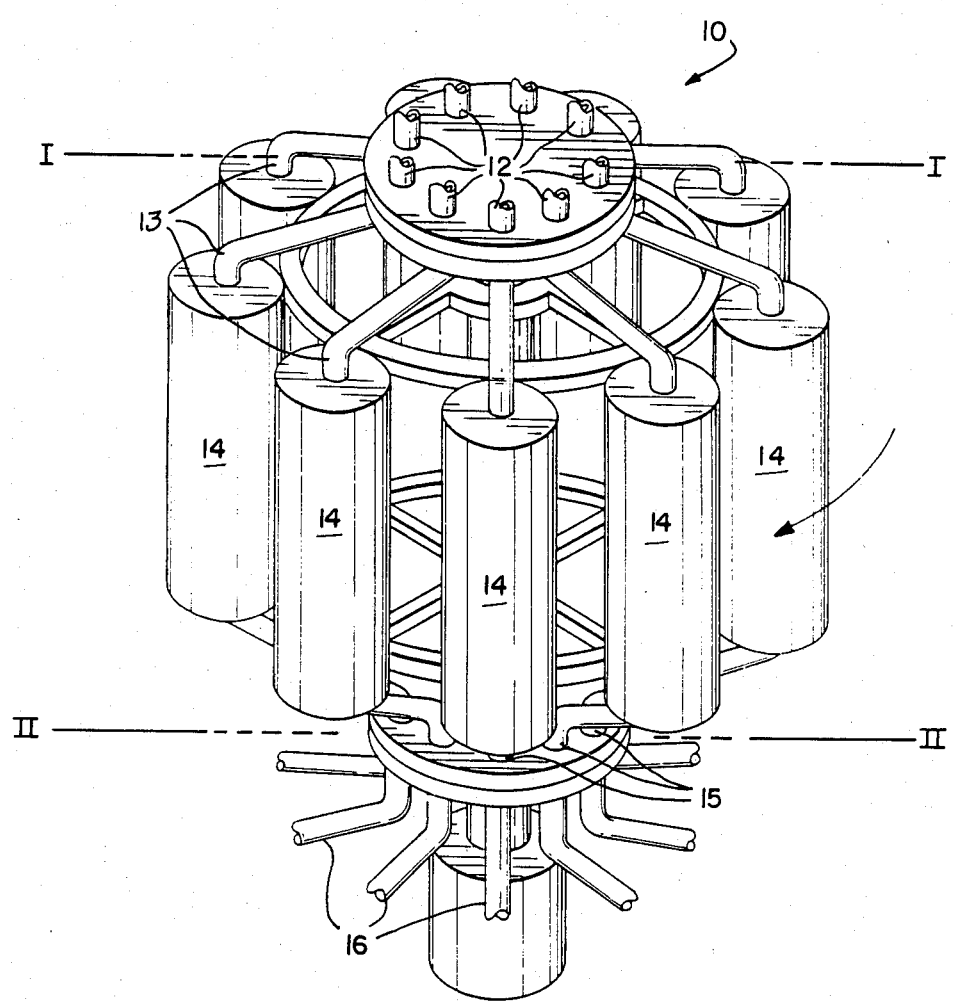
FIG. 2 is a perspective view of the Advanced Separation Device.

For convenience, a brief description of the ASD, illustrated at FIG. 2, will be provided.

The ASD 10 comprises a plurality of fixed feed ports 12, to each of which may be supplied various feed materials. In the case of the present invention, those materials include ambient air as well as recycled streams of oxygen enriched and oxygen depleted air.

Moving about a circular path in periodic fluid communication with each of the above-described fixed feed ports 12 are a plurality of chambers 14 filled with an adsorbent which is capable of adsorbing oxygen, or any other component for which enrichment is desired. In the particular embodiment illustrated, the rotating chambers 14 are connected to the fixed feed ports 12 via the conduits 13, which themselves rotate along with the chambers. In similar fashion, a plurality of fixed discharge ports 16 are provided at an end of the chambers opposite to that of the fixed feed ports 12. The rotating chambers 14 are connected to the fixed discharge ports 16 via the conduits 15, which themselves rotate. Generally, each fixed feed port 12 will have a corresponding fixed discharge port 16.

The feed materials are supplied continuously to their respective feed ports for periodic interaction with the adsorbent in each of the chambers 14. As material is discharged from the rotating chambers 14 through one of the fixed discharge ports 16, it may be purged from the system, recirculated back to a selected feed port, or a combination of both.

The size and number of chambers 14 is strictly a matter of design choice dependent upon the degree of enrichment sought, the type of adsorbent used, and the volume of enriched air required. At a minimum, there should be at least about 25-30% more rotating chambers than fixed beds to avoid dead spots. Thus, it is within the ambit of this invention to provide 10-15 fixed feed ports and up to 60 rotating chambers. The system is effectively operated in a thermal swing mode at pressures between about 1 and about 4 atmospheres.

The type of adsorbent used is entirely dependent on the gaseous component enriched. When it is desired to enrich the oxygen content of air, adsorbents such as activated carbon molecular sieves and hexacyano molecular sieves such as those developed by Union Carbide and described in U.S. Pat. No. 4,477,418 may be used. Where it is desired to enrich the organic solvent concentration in a mixture containing the solvent and air, an adsorbent such as activated carbon would be suitable. As long as the adsorbent has a higher affinity for the component being enriched and will release that component when desired, the adsorbent may be used in conjunction with the presently claimed process.

There are not strict temperature requirements for carrying out the process so long as the feed materials used in the desorption stage are at a higher temperature than those used during the adsorption stage. Typically, therefore, the temperature of the feed being adsorbed can range from about 32° F. to about 100° F., the upper limit being the more critical since higher temperatures disfavor gaseous adsorption. The materials fed to the desorption stage can typically range from 150° F. to 300° F., the temperature being dependent primarily on the nature of the adsorbent.

Optionally, one or more additional feed ports may be provided in order to supply a stream of cooling air to the adsorbent after the desorption stage. This additional stream would act to decrease the temperature of the adsorbent from the at least 150° F. employed during desorption to the maximum of about 100° F. employed for adsorption. When the additional cooling feed ports are not provided, the adsorbent will typically be cooled by an excess of air fed through the adsorption stage feed ports.

The rotational speed of the adsorbent-filled chambers is highly dependent on the construction of the ASD used i.e., the diameter of the chambers; the properties of the adsorbent i.e., its loading capacity; the depth of the adsorbent in the chambers and the material flow rates.

The present process enables air to be enriched to contain in excess of 30% by volume of oxygen in contrast to the 21% normally found.

The following Examples are presented solely for illustrative purposes and should in no way be construed as limiting the process disclosed and claimed.

EXAMPLE 1

Figure 3:
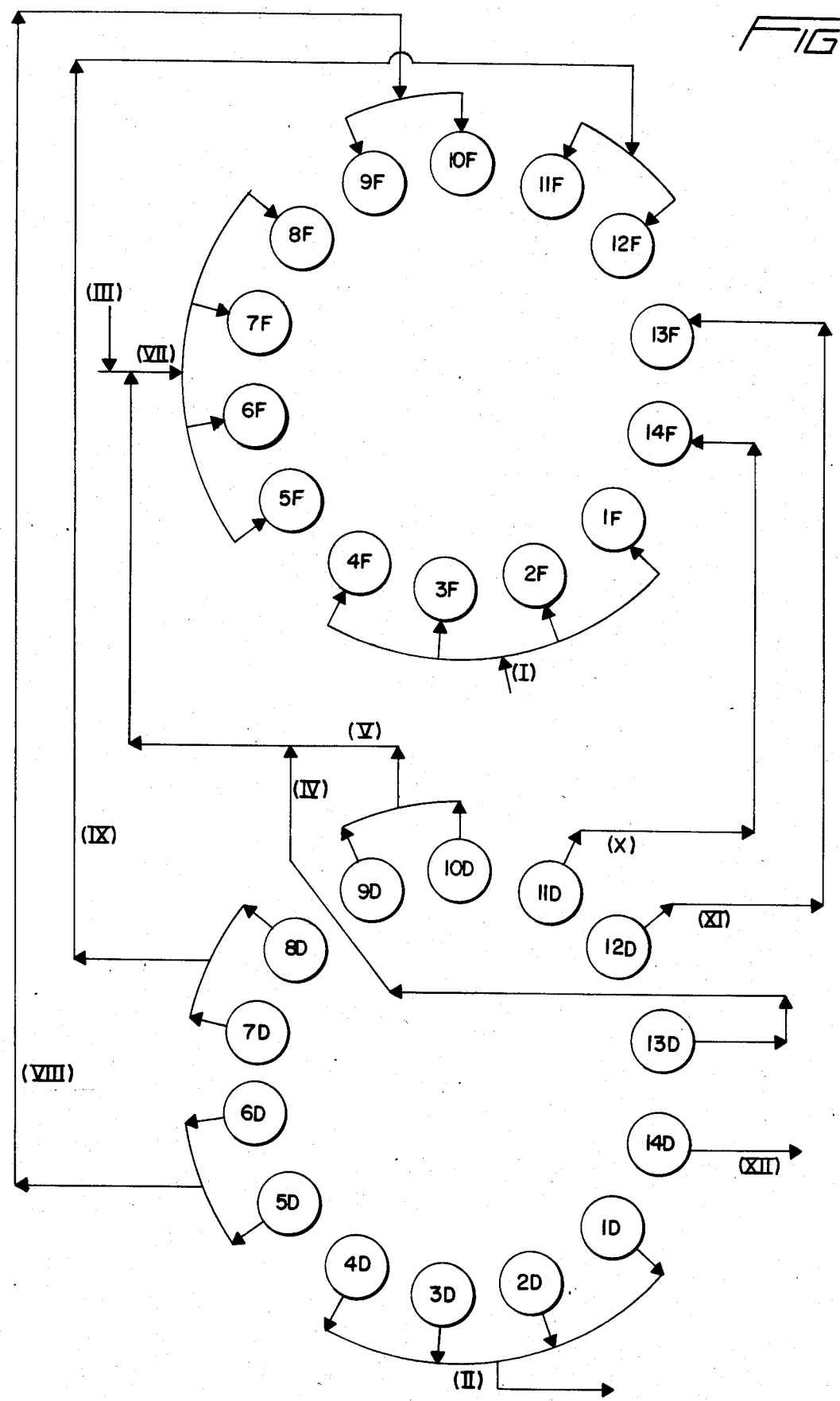
FIG. 3 is a cross-sectional view taken along lines I—I and II—II of FIG. 2 which shows the fixed feed ports and fixed discharge ports respectively.
Figure 4:
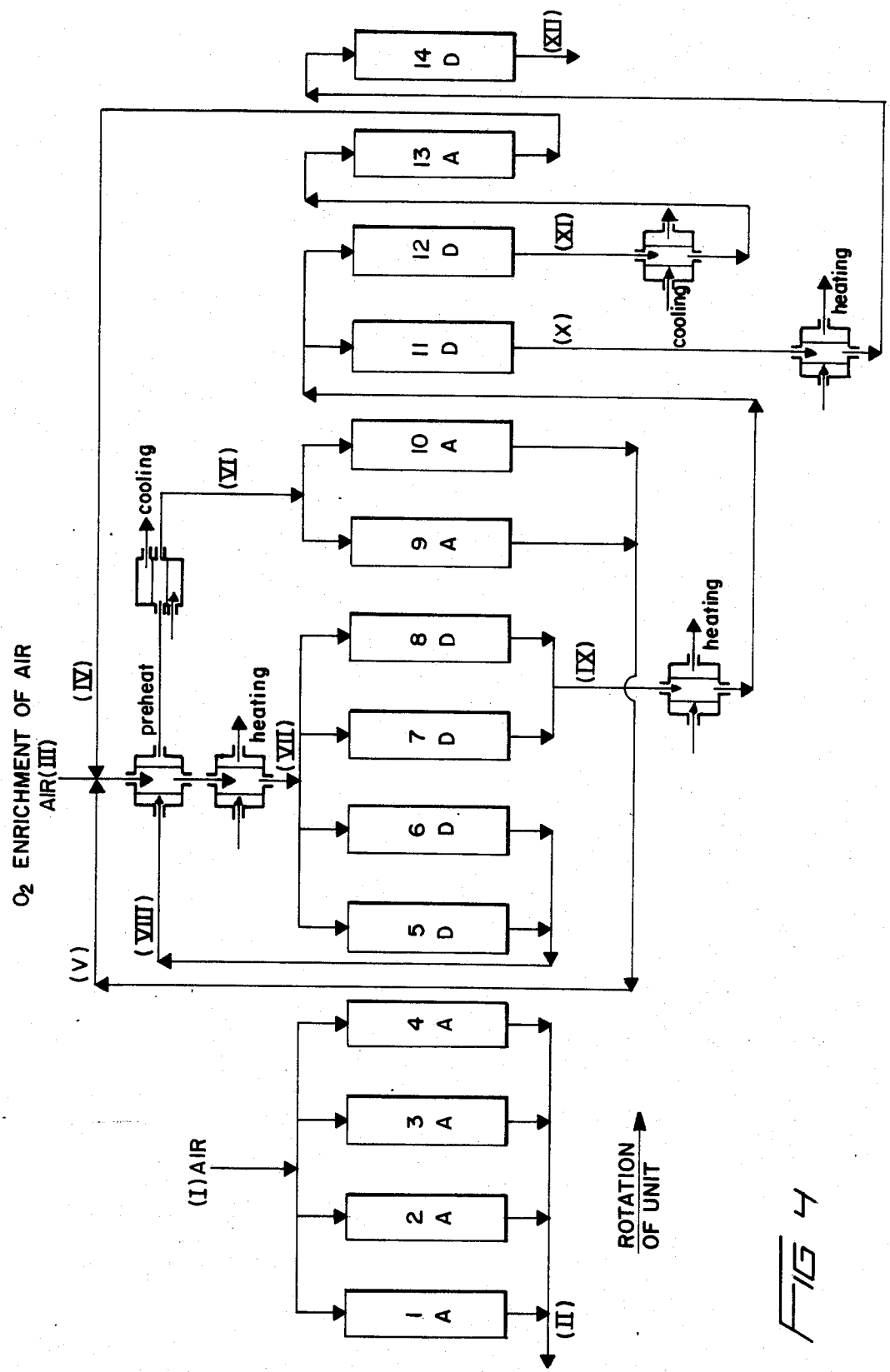
FIG. 4 is a schematic illustration of the process being carried out in the Advanced Separation Device.

Referring now to FIGS. 3 and 4, the process for enriching the oxygen content of air is illustrated. The particular embodiment illustrated utilizes fourteen fixed feed and discharge ports as well as twenty rotating chambers. The fixed feed ports 1F–14F as well as the fixed discharge ports 1D–14D are depicted in FIG. 3. The general process is illustrated schematically in FIG. 4. FIG. 4 should be viewed as illustrating the fixed feed and discharge ports. The rotating adsorbent-filled chambers can be viewed as a continuous or "infinite" bed.

When using molecular sieving as the adsorbent, it is possible to obtain 50,000 std ft$^3$/hr of air containing 30% by volume $O_2$ using twenty chambers 1 ft in diameter with a volume of 3 ft$^3$ filled with adsorbent to a depth of 2 ft. Of course, if greater volumes of enriched air are required, or if a further enriched air is needed, the size and number of adsorbent-filled chambers may be varied accordingly. The system is effectively operated in a thermal swing mode at a total system pressure of two atmospheres.

As illustrated in FIGS. 3 and 4, ambient air (I) is supplied to fixed feed ports 1F to 4F for delivery to the adsorbent-filled chambers where oxygen is loaded onto the adsorbent and the stream of air (II), which is now oxygen depleted, is expelled out of the system through fixed discharge ports 1D to 4D. The temperature of the entering air (I) is no greater than about 100° F. to insure adequate adsorption of the oxygen onto the adsorbent.

Into fixed feed ports 5F to 8F are fed ambient air (III), recycled oxygen depleted stream (IV) originating from fixed discharge port 13D and recycled oxygen depleted stream (V) originating from fixed discharge ports 9D and 10D. The proportion by volume of streams (III), (IV) and (V) which are combined into a single stream (VII) for entry into ports 5F to 8F ranges from 5 to 10 parts (III), 0 to 10 parts (IV) and 0 to 10 parts (V). This is controlled using standard blowers, automatic valves and conventional flow ratio control systems.

Because the stream (VII) is fed into the ASD in order to strip the adsorbent of the $O_2$ loaded while the chambers were being fed by cool air through ports 1F to 4F, the stream must be at a temperature greater than that of the ambient air feed stream (I). Generally, temperatures ranging from 150° to 300° F. are found satisfactory. The upper limit is dependent on the nature of the adsorbent.

The stream (VII) fed into ports 5F-8F thus strips the oxygen from the adsorbent and is discharged from the ASD as two separate oxygen-enriched streams namely, stream (VIII) which originates from ports 5D and 6D and stream (IX), which originates from ports 7D and 8D.

Stream (VIII) containing oxygen-enriched air is then cooled and supplied to fixed ports 9F and 10F where it is then delivered to chambers 14 where the higher levels of $O_2$ contained therein are loaded onto the adsorbent. As depicted in FIG. 4, stream (VIII) is cooled by heat exchange with stream (VII).

Stream (IX), which also contains oxygen-enriched air is heated and supplied to fixed ports 11F and 12F where it is delivered to the chambers containing adsorbent loaded with the $O_2$ by oxygen-enriched stream (VIII). In this manner, the oxygen present in the first oxygen-enriched stream (VIII) is transferred to the second oxygen-enriched stream (IX) to produce double enriched streams of air (X) and (XI).

By following a similar procedure, a triple-enriched stream of air is obtained. More specifically, the double enriched stream (XI) is cooled and delivered to fixed port 13F for loading of the oxygen contained therein onto the adsorbent. The stream (X) of double enriched air is then heated and delivered to feed port 14F where it desorbs the oxygen deposited onto the adsorbent by stream (XI) to produce a triple-enriched stream of air.

The oxygen depleted stream (IV) being discharged from port 13D is then recycled, as previously indicated, and combined with streams (III) and (V) for delivery to fixed ports 5F to 8F.

By the above-described process, it is now possible to actually divide a stream of enriched air so as to use one stream to further enrich the other stream. Such may be done continuously and economically, i.e., without complicated valving arrangements, by virtue of the ASD.

The present process enables air to be enriched to contain in excess of 30% by volume of oxygen in contrast to the 21% normally found.

EXAMPLE 2

For simplicity, the Example shown is based on a socalled "single-pass" system to produce 60,000 SCFH of 30% by volume oxygen enriched air.

Figure 5:
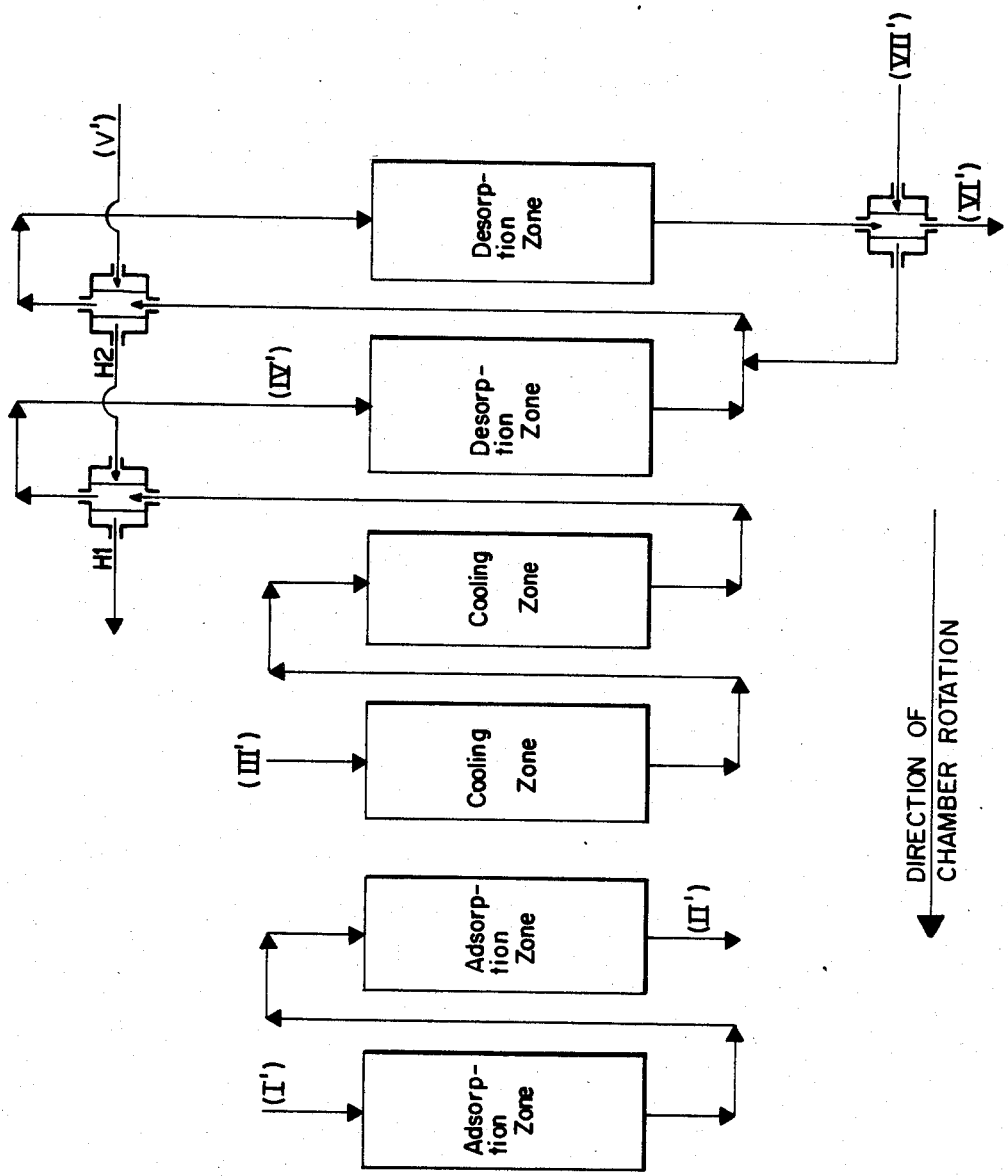
FIG. 5 is a schematic view of a single pass oxygen enrichment process carried out in the Advanced Separation Device.

A single pass oxygen enrichment system is shown in FIG. 5. The single pass concept illustrates the technique of continuous $O_2$ adsorption/desorption using the ASD system. Any number of stages with intrastage heating and cooling can be utilized depending on the gases being processed, the adsorbent used and the degree of recovery or enrichment desired for the end use.

Referring to FIG. 5, ambient air is introduced in a two-stage counter-current fashion into the adsorption zone of the ASD. For this system, 60,000 standard cubic feet per hour of 30% oxygen enriched air is the desired end product. The ASD consists of multiple feed ports and uses 20 chambers one foot in diameter by three feet in height, containing a depth of two feet of molecular sieve type carbon. The rotational speed of the ASD is between 20 and 30 minutes revolution. The entire system is operated at a pressure of 2 atmospheres.

The ambient air (stream I') passes through the adsorption zone wherein a portion of the contained oxygen is adsorbed onto the carbon. Depleted air (II') exits the ASD and is discharged.

Moving now in the direction opposite of rotation for purposes of clarity, the bed after desorption is warm and some cooling is beneficial in order to maximize adsorption in the subsequent adsorption zone. Ambient air (III') is passed in a counter-current fashion through the cooling zone. Approximately 20,000 to 25,000 standard cubic feet per hour are utilized in this step. This air is combined with preheated ambient air originating in stream (VII') and the mixture passes through heat exchanger H1 where the temperature is elevated to 200° F. or greater. The heated air leaves the exchanger and passes into the desorption zone where it removes residual oxygen from the sieving carbon. The discharged partially enriched air from this zone passes through a second heat exchanger H2 where the temperature of the gas is increased to 300° F. or greater depending on the limitation of the carbon or adsorbent. Heating of the air is accomplished in counter-current heat exchangers and hot combustion gas originating from any standard source (V') is used as the heating medium. Other techniques such as thermal fluid heat transfer, waste heat recovery and the like can be used to achieve this heating stage.

The hot gas from the second heat exchanger H2 passes through the activated carbon to produce an enriched air at approximately 300° F. or above, again depending on the adsorbent, and at a rate of about 60,000 standard cubic feet per hour. This enriched air is passed through a third heat exchanger H3 (preheater) in order to reclaim a portion of the heat and minimize thermal energy costs associated with the process. The final enriched air (VI') contains approximately 30% oxygen and is sent on to further processing or to the end use.

Approximately 55 pounds per minute of sieving carbon is moving between zones as a result of the ASD approach. The total carbon charge is on the order of 1,100 pounds. Thus it is apparent that fairly significant quantities of enriched air are produced with a minimal amount of carbon charge.

If desired the enriched air contained in stream 6 can be sent to additional adsorption zones as indicated in FIG. 4. In this manner a bootstrap technique is utilized to build up the final concentration of oxygen.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A process for enriching oxygen content of air comprising the steps of:
   (i) providing a plurality of adsorbent-filled chambers moving about a circular path sequentially in periodic fluid communication with a plurality of fixed feed ports including adsorption stage feed ports and desorption stage feed ports and corresponding fixed discharge ports including adsorption stage discharge ports and desorption stage discharge ports at an end of said chambers opposite to said respective feed ports;
   (ii) supplying a first stream of air at a first temperature to a first fixed adsorption stage feed port for delivery to said adsorbent-filled chambers, the oxygen in said first stream of air being loaded onto said adsorbent;
   (iii) supplying a second stream of air at a second temperature greater than said first temperature to a fixed desorption stage feed port for delivery to said chambers, said second stream of air removing the oxygen loaded onto said adsorbent in step (ii) to produce a stream of air having an increased concentration of oxygen;
   (iv) dividing said stream of air having an increased concentration of oxygen into a first enriched stream and a second enriched stream;
   (v) cooling and supplying said first enriched stream to a second fixed adsorption stage feed port for delivery to said adsorbent-filled chambers, the oxygen in said first enriched stream being loaded onto said adsorbent; and
   (vi) heating and supplying said second enriched stream to a second fixed desorption stage feed port for delivery to said chambers, said second enriched stream removing the oxygen loaded onto said adsorbent in step (v) to produce a stream having a further increased concentration of oxygen.

2. The process of claim 1 further including the steps of:
   (vii) dividing said stream having a further increased concentration of oxygen into a first further-enriched stream and a second further-enriched stream;
   (viii) cooling and supplying said first further-enriched stream to a third fixed adsorption stage feed port for delivery to said adsorbent-filled chambers, the oxygen in said first further-enriched stream being loaded onto said adsorbent; and
   (ix) heating and supplying said second further-enriched stream to a third fixed desorption stage feed port for delivery to said chambers, said second further-enriched stream removing the oxygen loaded onto said adsorbent in step (viii) to produce a stream of air having a still further increased concentration of oxygen.

3. The process of claim 1 wherein said adsorbent is an activated carbon molecular sieve or a hexacyano molecular sieve.

4. The process of claim 1 wherein said first stream of air is at a temperature below about 100° F. and wherein said second stream of air is at a temperature above about 150° F.

5. The process of claim 1 wherein said plurality of adsorbent-filled chambers rotate at a rate of from about 5 to about 60 minutes per revolution.

6. The process of claim 1 wherein the pressure at which said process is carried out ranges from about 1 to about 4 atmospheres.

7. The process of claim 1 wherein said feed and discharge ports further include at least one cooling stage feed port and corresponding cooling stage discharge port, a stream of cooling air being supplied to said cooling stage feed port for delivery to the adsorbent-filled chambers to cool the adsorbent therein from said second temperature to said first temperature.

8. A process for increasing the concentration of one gaseous component of a multi-component gas comprising the steps of:
   (i) providing a plurality of chambers containing an adsorbent having an affinity for said one component;
   (ii) moving said plurality of chambers about a circular path sequentially in periodic fluid communication with a plurality of fixed adsorption stage feed ports and desorption stage feed ports and corresponding fixed adsorption stage discharge ports and desorption stage discharge ports at an end of said chambers opposite to said respective feed ports;
   (iii) supplying a first stream of said multi-component gas at a first temperature to a first fixed adsorption stage feed port for delivery to said adsorbent-filled chambers, the one gaseous component in said first stream of said multi-component gas being loaded onto said adsorbent;
   (iv) supplying a second stream of said multi-component gas at a second temperature greater than said first temperature to a first desorption stage feed port for delivery to said chambers, said second stream of the multi-component gas removing the one gaseous component loaded onto said adsorbent in step (iii) to produce a stream of gas having an increased concentration of said one component;
   (v) dividing said stream of gas having an increased concentration of said one component into a first enhanced stream and a second enhanced stream;
   (vi) cooling and supplying said first enhanced stream to a second fixed adsorption stage feed port for delivery to said adsorbent-filled chambers, the one component in said first enhanced stream being loaded onto said adsorbent; and
   (vii) heating and supplying said second enhanced stream to a second fixed desorption stage feed port for delivery to said chambers, said second enhanced stream removing the one component loaded onto said adsorbent in step (vi) to produce a stream of gas having a further increased concentration of said one component.

9. The process of claim 8 further comprising the steps of:
   (viii) dividing said stream of gas having a further increased concentration of said one component into a first further-enhanced stream and a second further-enhanced stream;
   (ix) cooling and supplying said first further-enhanced stream to a third fixed adsorption stage feed port for delivery to said adsorbent-filled chambers, the one component in said enhanced stream being loaded onto said adsorbent;
   (x) heating and supplying said second further-enhanced stream to a third fixed desorption stage feed port for delivery to said chambers, said second further-enhanced stream removing the one component loaded onto said adsorbent in step (ix) to produce a stream of gas having a still further increased concentration of said one component.

* * * * *